(12) United States Patent
Firey

(10) Patent No.: US 6,530,979 B2
(45) Date of Patent: Mar. 11, 2003

(54) FLUE GAS CLEANER

(76) Inventor: Joseph Carl Firey, P.O. Box 15514, Seattle, WA (US) 98115-0514

(*) Notice: Subject to any disclaimer, the term of this patent is extended or adjusted under 35 U.S.C. 154(b) by 0 days.

(21) Appl. No.: 09/921,177

(22) Filed: Aug. 3, 2001

(65) Prior Publication Data

US 2003/0029318 A1 Feb. 13, 2003

(51) Int. Cl.[7] ................................. B01D 45/12
(52) U.S. Cl. .................... 95/270; 55/406; 55/459.1; 96/15; 96/359; 96/397; 415/169.2
(58) Field of Search .................... 95/267, 269, 270, 95/271; 55/403, 404, 406, 459.1; 96/15, 355, 359; 415/169.2

(56) References Cited

U.S. PATENT DOCUMENTS 2,897,917 A * 8/1959 Hunter ..................... 415/143

FOREIGN PATENT DOCUMENTS

JP          2-298309 A    * 12/1990  ............... 96/359

* cited by examiner

Primary Examiner—Robert A. Hopkins

(57) ABSTRACT

Apparatus and a process are described, wherein furnace flue gas, containing moisture, is expanded through a pressure drop sufficient to cause saturation of the gas. The resulting condensation of water increases the mass of particles, making them easier to separate from the gas. Acid components of the flue gas may be similarly rendered more easily separable. These wetted particles are then separated and removed from the flue gas. The cleaned flue gas is then compressed backup to chimney pressure for discharge.

A flue gas cleaner of this invention thus renders particle forming fuels, such as low cost coal, more readily useable, while meeting appropriate particle emissions requirements.

27 Claims, 9 Drawing Sheets

FLUE GAS CLEANER

BACKGROUND OF THE INVENTION

1. Field of the Invention

This invention is in the field of apparatus and process for removing liquid and solid particles from gases, and especially furnace flue gases from coal burning furnaces.

2. Description of the Prior Art

A preferred method for burning coal, in boiler and other furnaces, is as pulverized coal in very small, and hence fast burning particles. The resulting ash particles are much smaller than the already small coal particles, and are, in consequence, difficult tot separate flue gas leaving the furnace. Water spray scrubbers and bag filters are used to remove some of these ash particles from the flue gas, but removal is incomplete. The resulting emissions of ash and other acid particles has limited the extent of utilization of coal, a low cost and readily available fuel.

It would be a public benefit if low cost coal emissions could be made comparable to emissions from more expensive petroleum and natural gas fuels. Known reserves of coal, both nationally and worldwide, are much greater than known reserves of petroleum and natural gas.

3. Definitions

The following terms are used herein and in the claims as defined herewith:

An expander is a gas flow channel through which gas flows from a higher pressure to a lower pressure. Some expanders, such as gas or steam turbines, are expander engines which produce a network output. The expander pressure ratio is the ratio of expander inlet pressure divided by expander outlet pressure.

Water can mean a liquid or a vapor or a mixture of both as in wet steam.

Flue gas is any industrial gas, such as the exit gas from a pulverized coal fired furnace. Many flue gases contain particles and other components, such as acids, which are preferably removed from the flue gas before discharge into the atmosphere.

A separator is a gas flow channel, within which a force is applied to the gas, such as centrifugal force or electrostatic force, generally across the principal direction of flow, tending to separate higher density materials from lower density materials.

SUMMARY OF THE INVENTION

A flue gas cleaner of this invention adds water vapor to a furnace flue gas and then expands the gas through a sufficient pressure decrease that water vapor condensation can occur. Particles in the flue gas and acid molecules trigger the water vapor condensation upon themselves, thus rendering them more readily separable from the flue gas. The expanded flue gas is passed through one or more separators, such as centrifugal separators or electrostatic separators, in order to separate the wetted particles and acids from the flue gas. The thusly cleaned flue gas is then compressed back up to chimney or other discharge pressure. The collected condensate is pumped out of the separator into a condensate collector.

It is a principal beneficial object of this flue gas cleaner invention, that very small particles, such as those formed in pulverized coal fired furnaces, can be wetted, and their mass increased, rendering them more easily separable from the furnace flue gas. In this way, low cost coal fuel can become more widely used while meeting appropriate emissions requirements.

BRIEF DESCRIPTION OF THE DRAWINGS

A schematic diagram of an example flue gas cleaner of this invention is shown in FIG. 1.

A diagram of the process for cleaning flue gas used in this invention is shown in FIG. 2.

Figure 3:
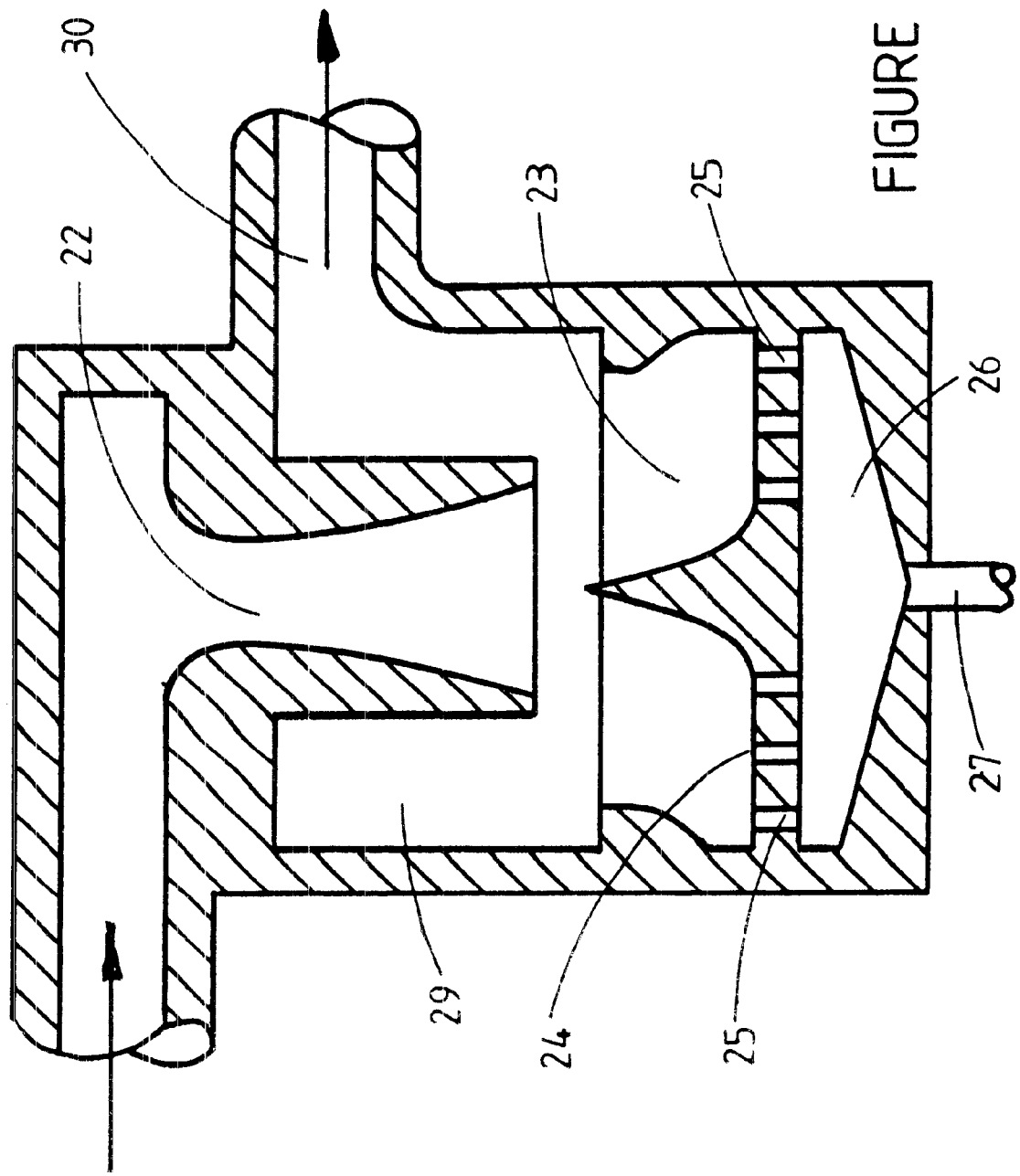

A simple, non work-producing expander suitable for use with a flue gas cleaner is shown schematically in FIG. 3.

Figure 4:
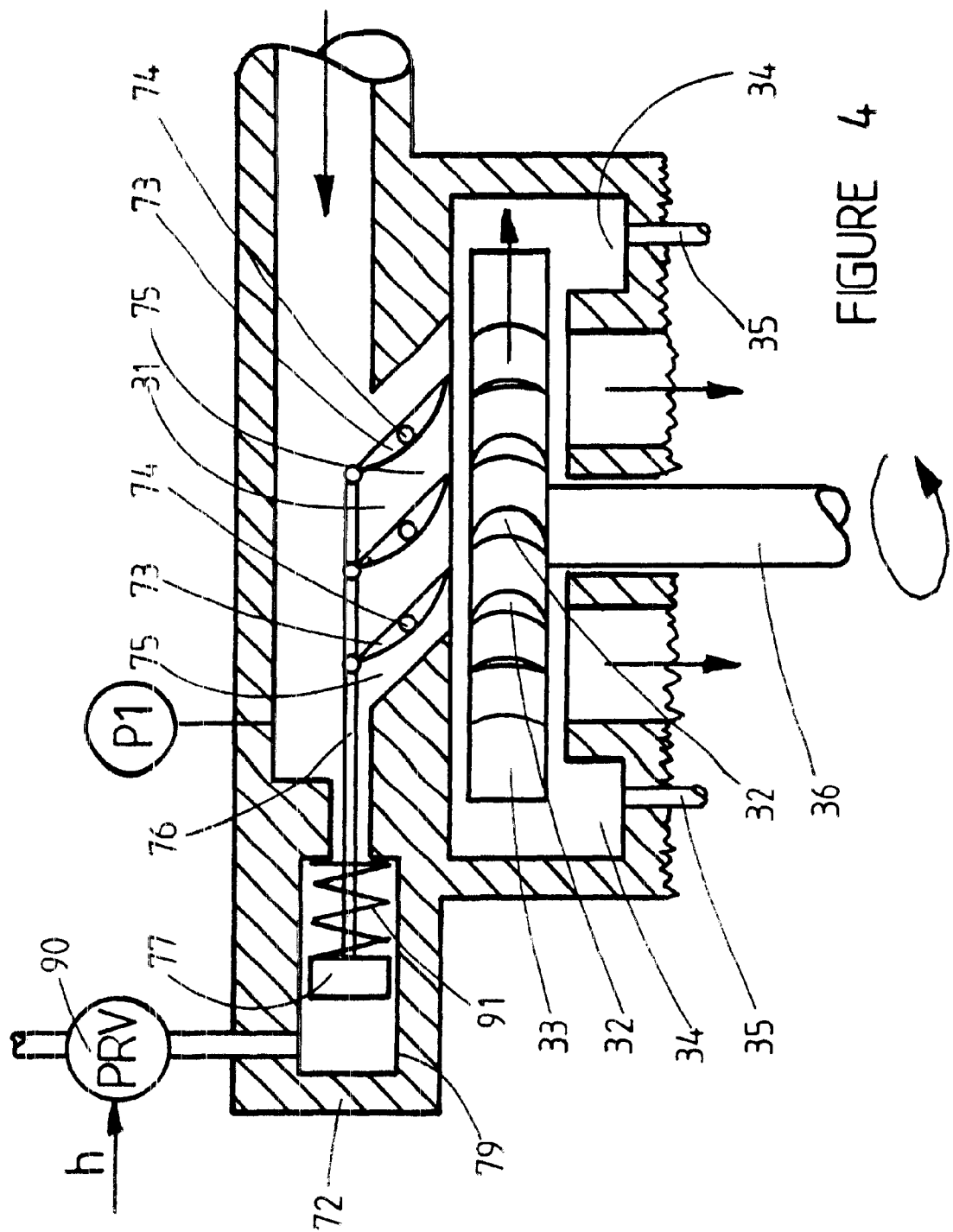

An expander engine is shown schematically in FIG. 4.

Figure 5:
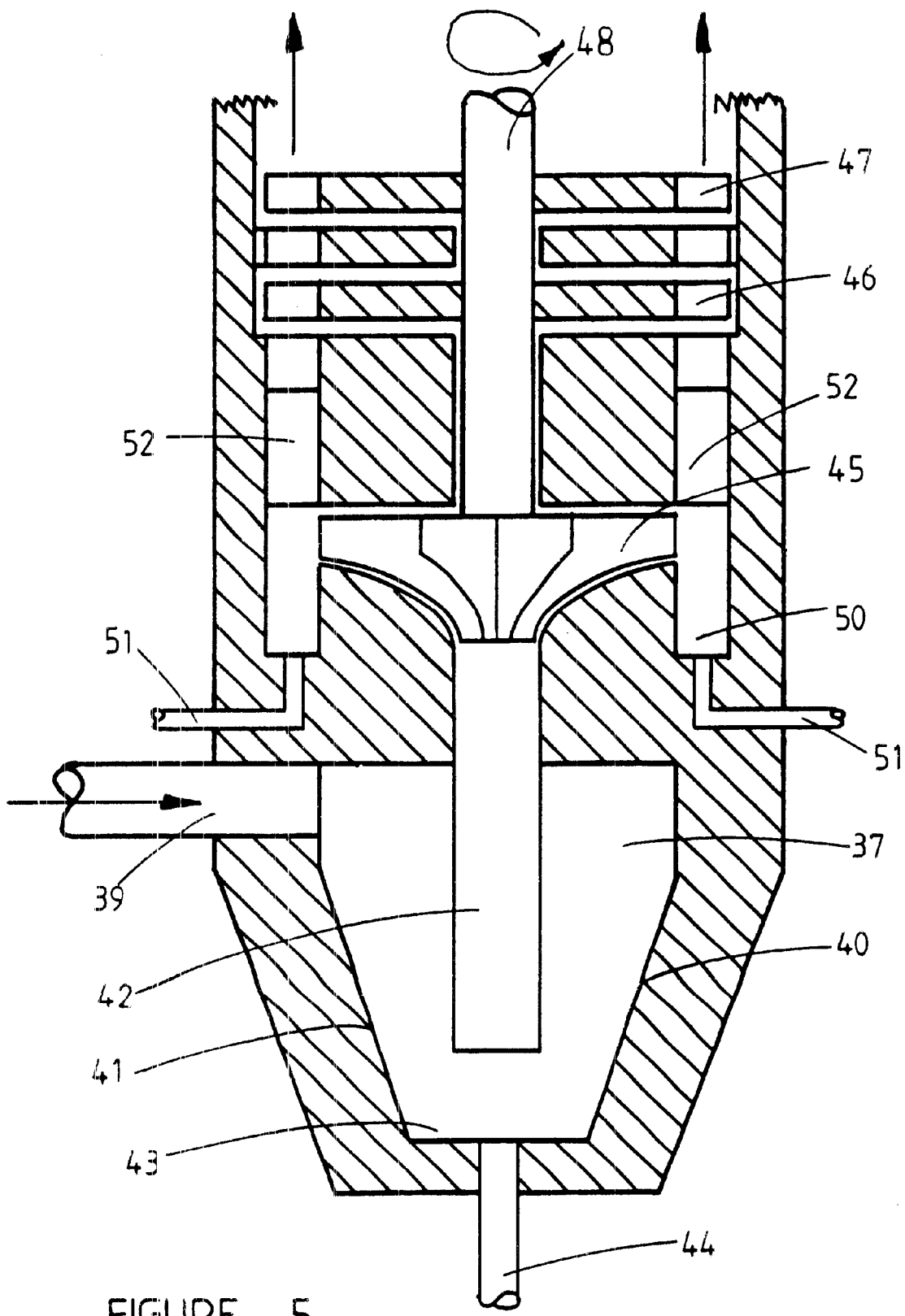

A combination of a cyclone separator in series with a centrifugal separator first compressor stage is shown schematically in FIG. 5.

Figure 6:
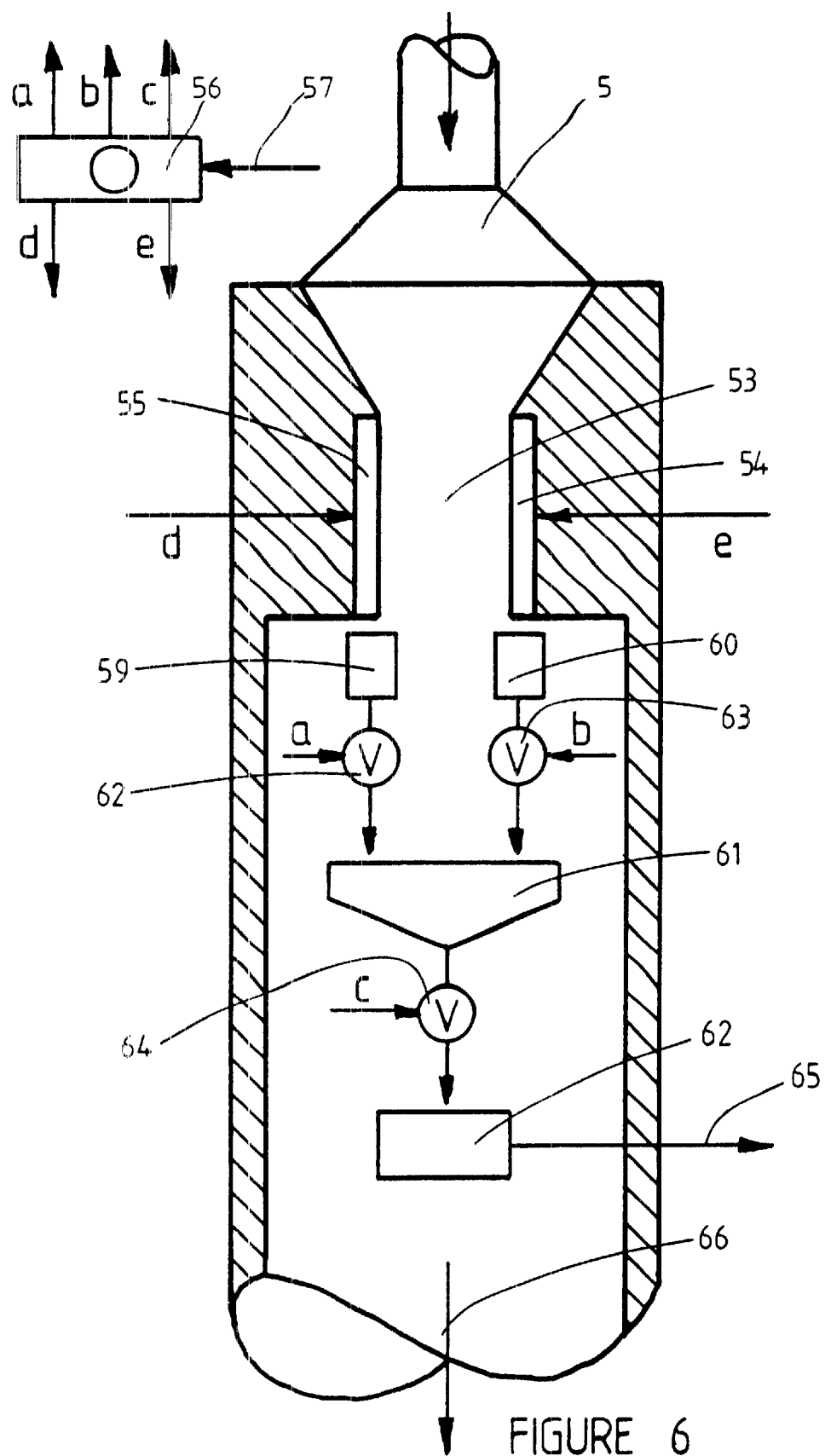

In FIG. 6 is shown a schematic drawing of an electrostatic separator.

Figure 7:
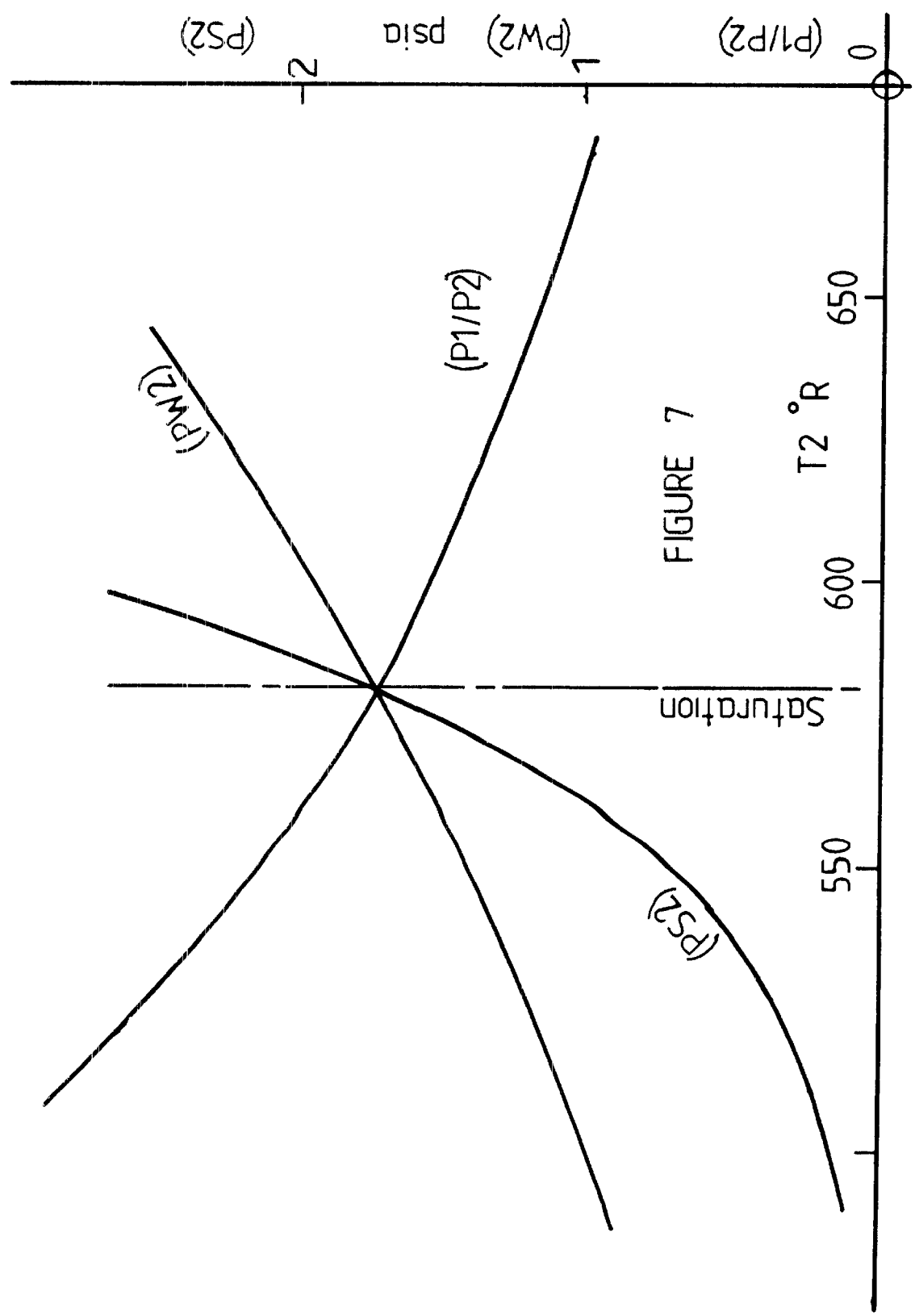

A graphical method for estimating the saturation pressure ratio of a flue gas is shown on FIG. 7.

Figure 8:
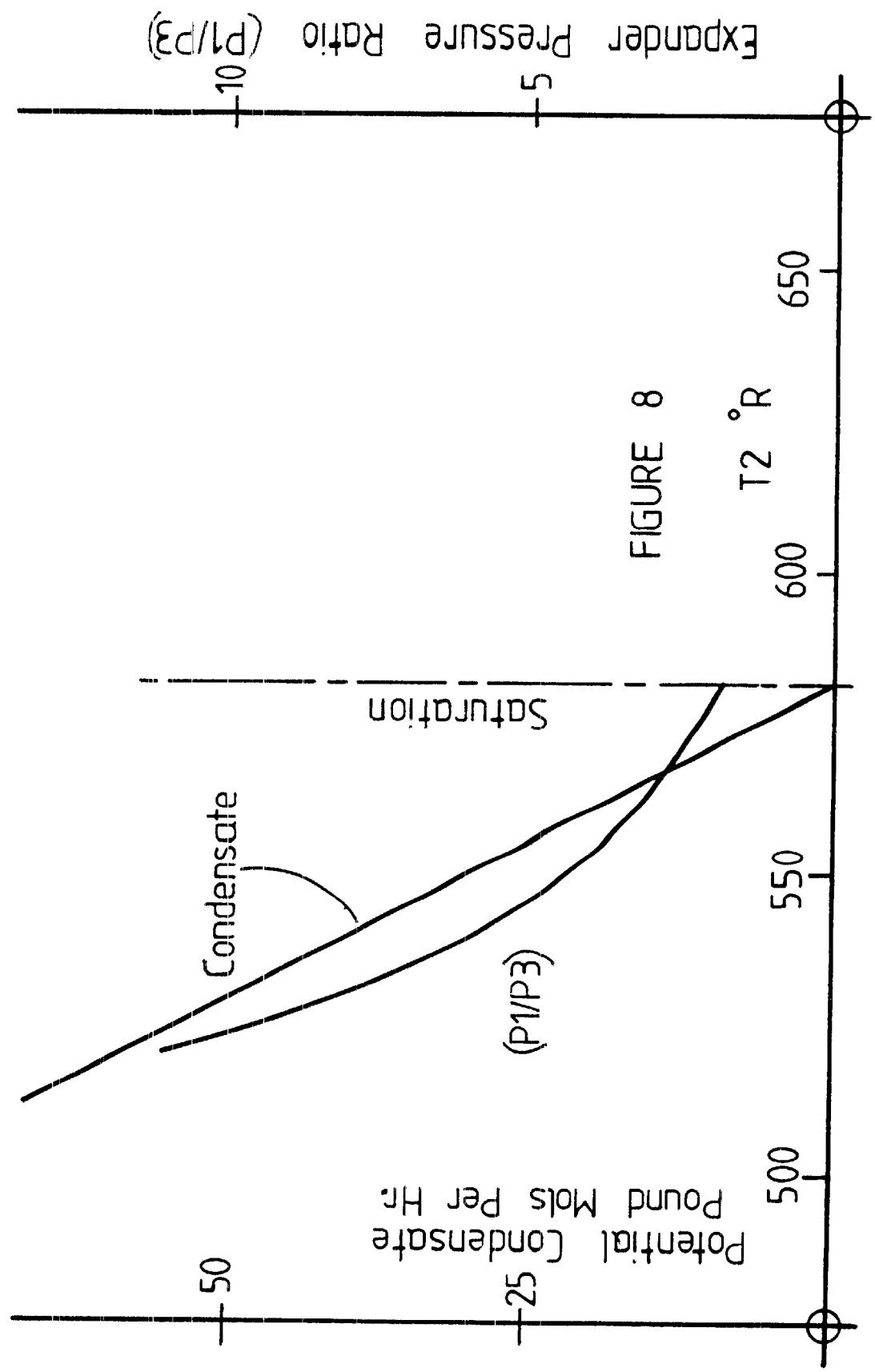

The effect of expander pressure ratio on the yield of potential condensate from a flue gas is shown graphically on FIG. 8.

Figure 9:
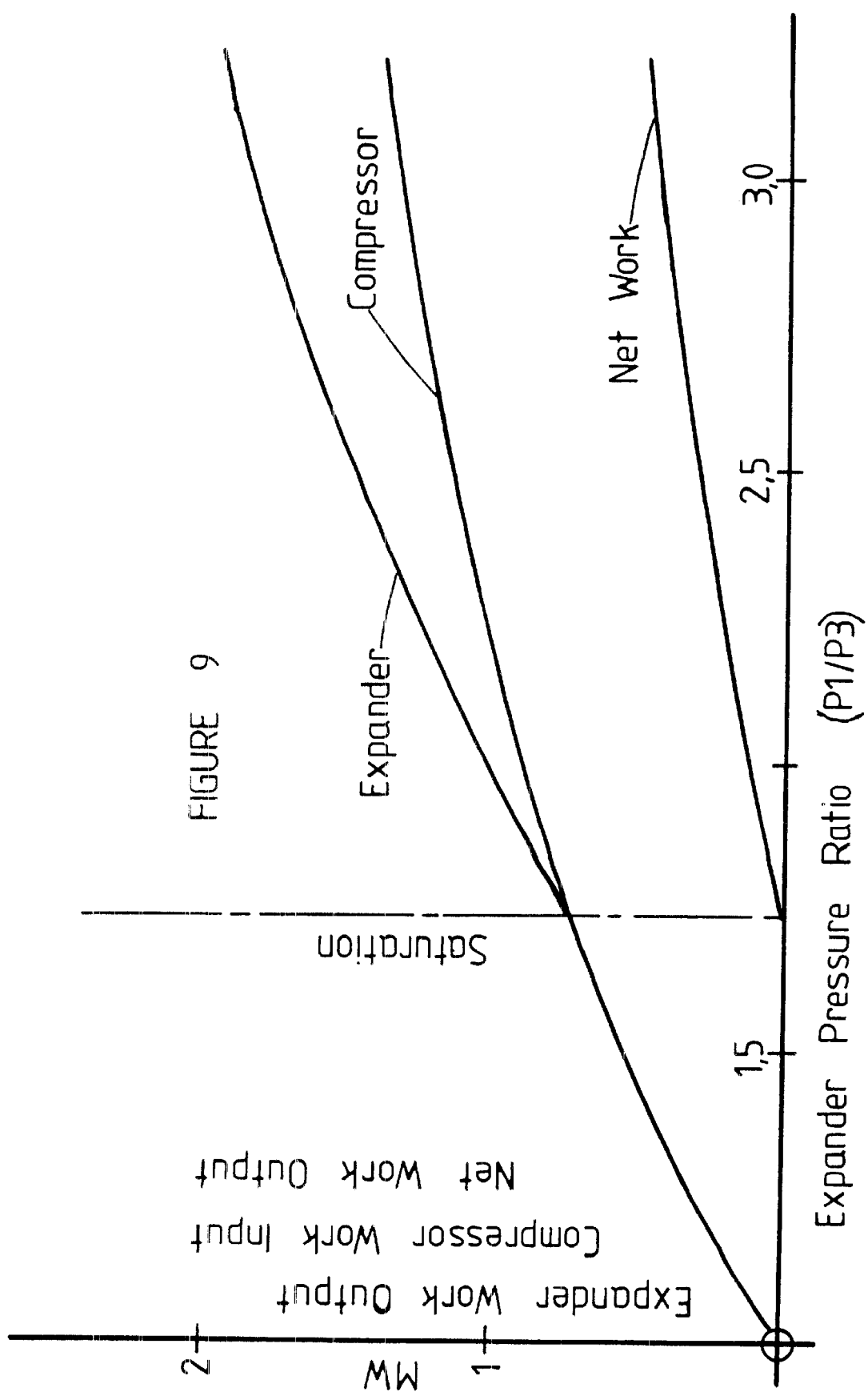

The effect of expander pressure ratio on expander work output, compressor work input, and net work output of a flue gas cleaner of this invention is shown graphically on FIG. 9.

DESCRIPTION OF THE PREFERRED EMBODIMENTS

A. Apparatus and Operation

Figure 1:
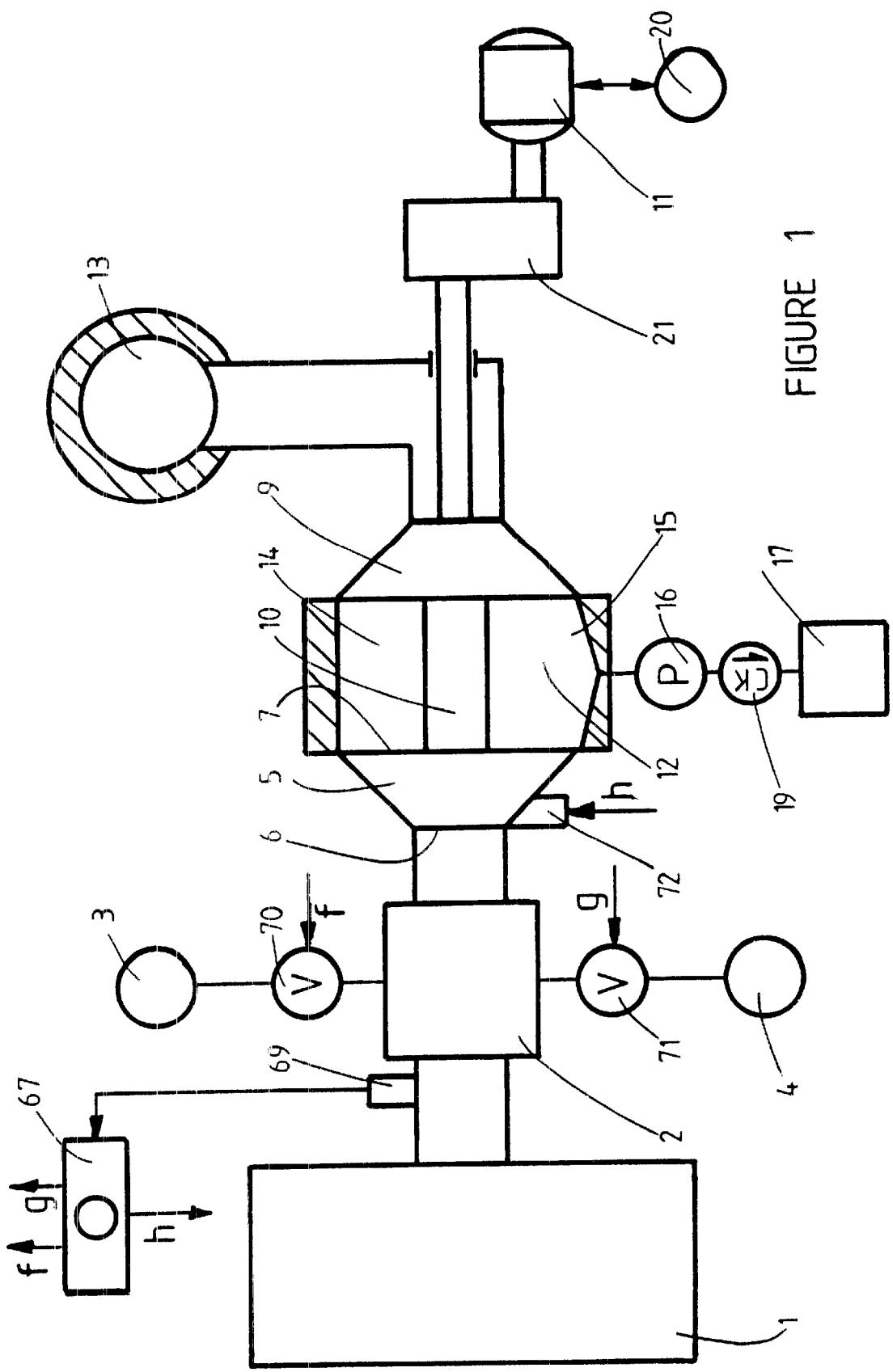

An example flue gas cleaner of this invention is shown schematically in FIG. 1 and comprises the following elements:

1. Furnace flue gas from a furnace, 1, flows into a mixer, 2, where liquid water from a source, 3, is added to reduce the flue gas temperature by evaporative cooling.
2. Steam from a source, 4, may also be added at the mixer, to further increase the water vapor content of the flue gas going into the expander, 5.
3. A high water vapor content and a low temperature are desired for the expander flue gas, in order to create a low value of saturation pressure ratio for the expander flue gas entering the expander, 5, at expander entry, 6.
4. The saturation pressure ratio is a property of the flue gas to be cleaned and can be defined as follows:
    Saturation pressure ratio is that expansion pressure ratio of expansion starting pressure, divided by expansion ending pressure, of an isentropic expansion, which causes the vapor pressure of water in the flue gas at expander ending to equal the vapor pressure of water, at expander ending temperature of the flue gas. A graphical method of determining the saturation pressure ratio of any particular expander flue gas is described hereinafter in the sizing section.
5. The expander flue gas flows into the expander, 5, via expander entry, 6, and through air expander pressure drop ratio of expander starting pressure at entry, 6, divided by expander ending pressure at exit, 7.
6. For a preferred form of this invention, the operating expander pressure ratio is to exceed the saturation pressure ratio of the expander flue gas, in order that water vapor may condense on to particles and acids in the flue gas. This condensation will increase the mass of the particles and the density of the acids, thus rendering them more easily separable from the a flue gas.

7. The expander, 5, is preferably an expander engine, producing a work output from the energy changes a gas experiences during expansion. This work output can be absorbed in various ways, such as for driving the compressor, 9, via the drive shaft, 10. For some applications a non engine expander, such as a simple nozzle, can be used, but appreciable work input from a compressor driver, 11, will then be necessary to drive the compressor, 9.

8. Various types of expander engines can be used, but turbo expanders will usually be preferred for those applications, such as a boiler furnace, where the volume flow rate of flue gas is large.

9. The compressor, 9, maintains a low pressure in the vacuum chamber, 12, by compressing the cleaned flue gas backup to flue gas pressure in the chimney, 13, or other receiver into which the cleaned flue gas is discharged.

10. Various types of gas compressors can be used but turbo compressors will frequently be preferred as better able to handle large volumes of flue gas.

11. In the particular example flue gas cleaner of FIG. 1, the vacuum chamber, 12, is also a gravity separator, 14, whose large volume and consequently low gas velocity, allow liquid and solid particles to settle by gravity into the collector, 15, at the bottom.

12. Other types of separators can be used, such as centrifugal separators, cyclone separators, and electrostatic separators, whose separating force will usually be greater, and thus more effective for separation, than the gravity force.

13. The condensate pump, 16, pumps the collected liquids and solids out of the collector, 15, into a condensate receiver, 17. A unidirectional flow device, 19, such as a check valve, prevents back flow into the vacuum chamber, 14. A positive displacement condensate pump with suitable seals could combine the pump and unidirectional flow device.

14. Expander work output is unlikely to exactly equal compressor required work input under all operating conditions. Thus the compressor driver, 11, can function as a power balancer to absorb work when expander work exceeds compressor work, and to supply work when compressor work exceeds expander work. A conventional induction motor is an example of such a power balancer either drawing power from the electrical grid, 20, or supplying power into the grid. This induction motor power balancer would additionally function as a controller of compressor and expander speed by connecting expander and compressor together and these to the power balancer, via a gear or belt drive, 21, or directly.

Figure 2:
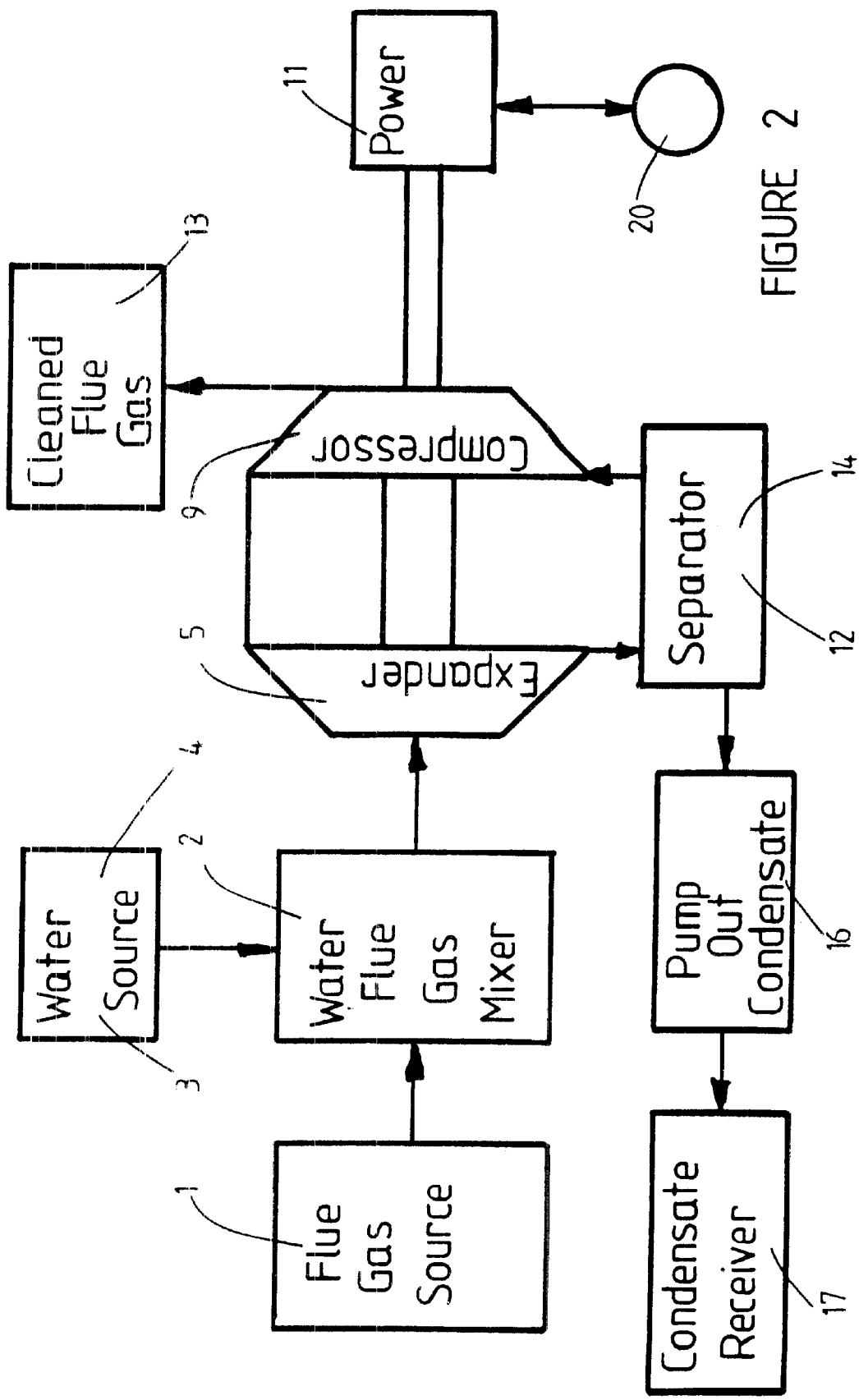

15. The furnace flue gas thus follows a flue gas flow path from the furnace through the mixer where water may be added, through a pressure decrease in the expander, causing water vapor to condense onto the particles through a separator where liquid and particles are separated from the cleaned flue gas, through a compressor which increases the flue gas pressure back to chimney pressure. The separated liquids and particles are then pumped out of the separator. This flue gas flow path is schematically shown in the process diagram of FIG. 2.

16. Prior art flue gas cleaners use water spray scrubbers and filters to remove particles from flue gases and these cleaners are reasonably effective for medium and larger size particles. In a flue gas cleaner of this invention, where expander pressure ratio exceeds saturation pressure ratio, supersaturation of the flue gas with water vapor will occur. Particles in the flue gas act to trigger condensation upon themselves from such a supersaturated gas. All particles, small medium and large, are thus quickly wetted and their mass thusly increased, and these wetted particles can be more readily separated from the flue gas. A prior art spray scrubber seeks to similarly wet the particles, but the spray water, being much less mobile than supersaturated water vapor molecules, is less effective in wetting all of the particles. This is a principal beneficial object of this invention, that condensation wetting and particle mass increase is achieved on particles of all sizes, and more complete removal of particles can be achieved than in prior art flue gas cleaners.

Acidic molecules, such as SOX and NOX, as well as heavy metal compounds, such as mercury compounds, may also similarly trigger liquid water condensation upon themselves from flue gases supersaturated with water vapor, due to overexpansion beyond the saturation pressure ratio. A flue gas cleaner of this invention may thus also achieve more complete removal of these acid and heavy metal undesirable components from furnace flue gas.

B. Apparatus Options

1. For furnaces already operating with water spray scrubbers, a mixer may not be needed for cooling the flue gas and increasing its water vapor content. For furnaces burning high hydrogen content fuels, such as natural gas, steam addition in the mixer may not be needed. For steam electric power plants, an economic balance must be struck between steam addition in the mixer and the consequent reduction of plant electric efficiency.

2. Flue gas cleaners of this invention can also be used to remove particulates from gases other than furnace gases. For example, air to be supplied to a clean room could be precleaned of particles by use of a flue gas cleaner of this invention.

3. An example simple non-engine, nozzle expander is shown schematically in FIG. 3 and comprises the following components:
    a. Flue gas to be cleaned passes through a simple nozzle, 22, wherein the energy of expansion is applied to increase the flue gas velocity and kinetic energy.
    b. The flow direction of the flue gas is essentially fully reversed in the stationary separator, 23, thus applying a strong centrifugal force to the flue gas across the direction of flow.
    c. Particles, and especially particles whose mass hasbeen increased by water vapor condensation thereon, will be centrifugally separated from the flue gas and will collect in the bottom, 24, of the separator, 23. These collected liquids and particles can bleed through the passages, 25, into the chamber, 26, from which they can be removed via a connection, 27, to a condensate pump.
    d. The thusly cleaned flue gas passes from the vacuum chamber, 29, to a compressor via the connection, 30.
    e. This example nozzle expander of FIG. 3, while simple and of low cost, produces no net work output for driving the compressor, and a large work input will be required to drive the compressor. For this reason, non-engine expanders will probably be useful in only a few cases. In the preliminary design of a flue gas cleaner, test runs on flue gas samples may be used to ascertain the best expander pressure ratio. A non-engine expander would be useful as simple and low cost and the compressor, being small, will not need a large driver.

4. Precooling the cleaned flue gas prior to recompression, and cooling the flue gas while flowing through the compressor, can be used to reduce the work required for driving the compressor.

5. To separate the liquid and solid particles from the flue gas, a force can be applied principally across the direction of gas flow, which acts more strongly on the particles than on the gas. Centrifugal force acts more strongly on the liquid and solid particles, since these are more dense than the gas. An electrostatic force can act selectively upon the liquid and solid particles when these carry an electrical charge. These centrifugal and electrostatic forces can be much greater than the gravity force used in the gravity separator of FIG. 1, and can thus achieve a more rapid separation of liquids and particles from the flue gas. Examples of centrifugal and electrostatic separators for flue gas cleaners of this invention are described hereinbelow.

6. An example of a turbo expander engine and centrifuge separator is shown schematically in FIG. 4 and comprises the following components:
   a. Flue gas to be cleaned is accelerated through the nozzles, 31, after which the flue gas flow direction is partially reversed by flow over the moving blades, 32, on the turbine engine rotor, 33. This flow reversal over the moving blades, 32, applies a centrifugal force tending to move the liquid and solid particles toward the blade surface. An additional centrifugal force is applied to liquid and solid particles on the blade surface, by the rotation of the turbine rotor, 33, and this latter centrifugal force acts to sling the separated liquid and solid particles into the collector, 34.
   b. From the collector, 34, the separated liquid and solid particles can be removed via the connection, 35, to a condensate pump.
   c. The work done on the moving turbine blades, 32, is transferred to the compressor or other power absorber via the rotor shaft, 36.

7. An example of a cyclone particle separator is shown schematically in FIG. 5, and comprises the following components:
   a. Expanded flue gas from the expander enters the cyclone cavity, 37, tangentially via the nozzle, 39, and centrifugal force acts on the flue gas as it rotates in the cavity, 37. As the rotating flue gas descends through the tapered section, 40, the increase of velocity and decrease of radius increases the centrifugal force, and liquid and solid particles are forced thereby to move outward to the cavity surface, 41.
   b. At the bottom of the cavity, 37, the flue gas is rotated approximately 180 degrees in order to exit from the cavity, 37, via the cyclone outlet, 42, and this rotation applies an additional centrifugal separating force.
   c. The thusly separated liquid and solid particles collect in the bottom, 43, of the cavity, 37, and are removed therefrom via the connection, 44, to the condensate pump.

8. Also shown schematically in FIG. 5 is a compressor whose first stage is a combined centrifugal compressor and centrifugal separator. This centrifugal separator is shown in series after the above described cyclone separator. The combined compressor and separator of FIG. 5 comprises the following components:
   a. The multistage compressor comprises a first stage centrifugal compressor, 45, and at least two subsequent axial flow compressor stages, 46, 47. The stage rotors, 45, 46, 47, are rotated via the compressor drive shaft, 49.
   b. Flue gas from the cyclone separator enters the centrifugal rotor, 45, wherein it is rotated at high speed, which applies a centrifugal force thereto. The consequently separated liquid and solid particles enter the collector ring, 50, and are removed therefrom via the connections, 51, to the condensate pump.
   c. The thusly cleaned flue gas flows through the diffuser, 52, of the centrifugal compressor, and on into the following axial flow compressor stages, 46, 47.

9. FIG. 5 illustrates the use of two or more separators operating in series. The cyclone separator separates the larger particles and then the centrifugal separator removes the smaller particles.

10. Particles suspended in an insulating gas, undergoing acceleration due to a pressure difference, may acquire an electrostatic charge due to frictional electrification, particularly if the flow passage is also an insulator. The particles, being of higher density than the gas, are less accelerated than the gas, and the consequent velocity difference provides the friction for electrification. The thusly charged particles can be separated from the gas by applying an electric field across the flow direction of the gas.

11. An example electrostatic particle separator is shown schematically in FIG. 6, and comprises the following components:
    a. Flue gas flows from an insulated expander engine, 5, into an electric field, 53, created by oppositely charging the two insulated plates, 54, 55, via the charge generator and controller, 56, with electric power input, 57.
    b. The entire flue gas flow path within the separator and including the expander, 5, is electrically insulated to prevent removal of the electric field, 53.
    c. The charged liquid and solid particles, having undergone acceleration and frictional electrification in the expander, 5, are attracted to the oppositely charged plates, 54, 55, by the force of the electric field, 53.
    d. The thusly separated liquid and solid particles drop into the first collectors, 59, 60, and from there into the second collector, 61, via controlled valves, 62, 63.
    e. From the second collector, 61, the separated liquid and solid particles drop into the final receiver, 62, via the controlled valve, 64, and are removed therefrom via the connection, 65, to a condensate pump. The three collectors are fully insulated from one another.
    f. The cleaned flue gas leaves this electrostatic separator via the passage, 66, to the compressor.
    g. The valves, 62, 63, 64, are controlled by the controller, 56, so that only one valve is open at a time. This interrupted flow, liquid and solids transfer means, creates a flow of liquids and solids from the plates, 54, 55, through the collectors, 59, 60, 61, and into the final receiver, 62, which is always discontinuous. In this way the flowing liquid cannot become an electrical flow path between the charged plates, 54, 55, or to ground.

h. With this electrostatic separator, it is not necessary that the solids be wetted by liquid condensate. But wetted particles can be more readily removed via the collection and interrupted flow transfer means and condensate pump than can dry particles.

C. Controls

A controller for a flue gas cleaner of this invention could function in various ways, as for example, the following:

1. Water admission to the mixer could be controlled in proportion to flue gas flow rate, in order to maintain the saturation pressure ratio of the flue gas within a narrow range.
2. Expander inlet nozzle flow area could be controlled, also in proportion to flue gas flow rate, in order to maintain the expander pressure ratio always greater than saturation pressure ratio, thus assuring potential condensation during expansion.
3. A particular example controller, 67, is shown schematically in FIG. 1 and FIG. 4, and comprises the following components:
    a. The controller, 67, is responsive to a flue gas flow rate sensor, 69, and is operative upon a liquid water control valve, 70, and a steam control valve, 71, to control expander flue gas temperature and water vapor content within a narrow range, and thus to control the saturation pressure ratio of the expander flue gas about to enter the expander, 5.
    b. Hand control of the water control valves, 70, 71, could be used but automatic control valves will frequently be preferred.
    c. The controller, 67, can additionally be operative upon an expander inlet nozzle area regulator, 72, to control expander pressure ratio to exceed saturation pressure ratio.
    d. An example of an expander inlet nozzle area regulator, 72, is shown schematically in FIG. 4, and comprises:
        (i) The inlet nozzle blades, 73, are rotatable about their shafts, 74, to adjust the inlet flow area, 75 of the nozzles.
        (ii) The control rod, 76, connects the blades, 73, to the control piston, 77, and cylinder, 79, of the regulator, 72.
        (iii) A control pressure from the pressure regulator valve, 90, acts on the piston, 77, against a spring, 91, to adjust the inlet nozzle flow area, 75, in proportion to flue gas flow rate.
4. Expander pressure ratio could alternatively be controlled by control of compressor speed, a higher expander pressure ratio being obtained at a higher compressor speed. For example, the speed of the power balancer, 11, of FIG 1 could be adjustable in proportion to flue gas flow rate, as by use of a variable speed motor generator, 11, or by use of an adjustable speed gear or belt drive, 21.

Sizing

A. To size a flue gas cleaner of this invention, at least the following properties of the flue gas are to be determined:
1. (FGM)=Mols furnace flue gas per hour from the furnace.
2. (LWM)=Mols liquid water per hour added to furnace flue gas in the mixer.
3. (STM)=Mols dry steam per hour added to furnace flue gas in the mixer.
4. (XGM)=Mols expander flue gas per hour at expander entry.
5. Molecular composition of the expander flue gas, percent by volume, $CO_2$, $H_2O$, $N_2$, $O_2$, CO, etc.
6. Properties of the expander flue gas at expander entry, PI, TI, CPX, K.
7. Properties of the furnace flue gas from the furnace, TF, CPF.
8. (XGM)=(FGM)+(LWM)+(STM).
9.
$$K = \frac{(CP)}{(CV)}$$

10. The expander can be assumed to be an expander engine since this will usually be preferred.

B. Expander flue gas properties are a result of mixing liquid water and dry steam into the furnace flue gas, hence approximately:

$$(FGM)(CPF)[(TF-(TI)]=(LWM)(hgi-hf)+(STM)[hgs-hgo]$$

The water and steam enthalpies being determined from steam tables:

(hgi)=Enthalpy of water, vapor from evaporation of the liquid water added in the mixer, per mol.
(hf)=Enthalpy of the liquid water prior to mixing, per mol.
(hgs)=Enthalpy of water vapor from the dry steam added in the mixer, normally equal to (hgi), per mol.
(hgo)=Enthalpy of the dry steam prior to mixing, per mol.

Liquid water and dry steam are thusly added to the furnace flue gas, in order to reduce the saturation pressure ratio of the expander flue gas, by reducing the gas temperature and increasing the water vapor content.

C. The expander pressure ratio (rpx) is preferably to exceed the saturation pressure ratio (srp) of the expander flue gas, which can be estimated as follows:

1. Tentatively assume isentropic expansion of the expander flue gas through a range of expander outlet pressures (P2) and calculate, for each such expander pressure ratio, the resulting expander flue gas temperature (T2) and partial pressure of water vapor (pw2)) as follows:

$$(T2) = (TI)\left(\frac{PI}{P2}\right)^{\frac{K-1}{K}}$$

$$(pw2)=(P2)(MFW)$$

(MFW)—Mol fraction water vapor in expander flue gas $$(rpx) = \frac{(PI)}{(P2)}$$

2. For each calculated value of expander outlet temperature (T2), determine vapor pressure of water, (ps2) from steam tables:
3. Plot (pw2), (ps2) and (rpx), versus (T2) on a common graph as shown, for example, in FIG. 7. The saturation pressure ratio (rps) is then that expander pressure ratio, and resulting temperature (T2) at which the partial pressure of water vapor in the expander flue gas (pw2) equals the vapor pressure of water (ps2), at the same temperature (T2).

4. Using an expander pressure ratio greater than this saturation pressure ratio of the expander flue gas, causes either supersaturation of the expander flue gas or condensation of a portion of the water vapor to a liquid. Condensation to liquid water will particularly take place upon solid and liquid particles in the flue gas, and upon acid molecules therein. These particles thus become more easily and upon acid molecules therein. These particles thus become more easily separated from the gas, since their mass has been increased by the added condensed water. This is one of the principal beneficial objects of this invention, to more efficiently separate particles and acids from furnace flue gases by increasing the mass of these particles with added water condensate. The greater the quantity of potential water condensate, the better the efficiency, of particle separation and consequent flue gas cleanup.

D. The potential water condensate quantity increases as the expander pressure ratio exceeds the saturation pressure ratio. An approximate estimate of this potential condensate quantity can be made for expander pressure ratios greater than the saturation pressure ratio, by following the expansion process after water vapor saturation is reached using the following arbitrary assumptions as an approximation:
 1. The water vapor portion of the flue gas expands essentially isentropically after saturation is reached. The consequent condensation of water vapor to liquid adds the latent heat of condensation to the remaining water vapor and dry gas portion of the flue gas.
 2. At each expander flue gas temperature (T2), the overall steam quality (X2) can be calculated from the constant entropy assumption. The potential condensate quantity can then be estimated as follows:

$$(CMP) = (XGM)(MFW)(1 - X_2)$$

(CMP)=Mols potential condensate per hour
 3. The water vapor and dry flue gas occupy the same volume, which can be calculated for the water vapor portion from the water vapor quality (X2) and the water vapor specific volumes from steam tables.
  (VST)=(XGM)(MFW)(X2)(vst)
  (vst)=Specific volume of water vapor at T2
  (VST)=Water vapor volume per hour at (T2) and X2) and also the dry flue gas volume at $T_2$)
 4. The partial pressure of the dry flue gas portion of the expander flue gas can be calculated as follows:

$$(PDG) = (PWS2)\frac{(XGM)(1 - MFW)}{(XGM)(MFW)(X_2)}$$

(pws2)=Saturated vapor pressure of water at T2
  (PDG)=Partial pressure of dry flue gas at T2
 5. The expander pressure ratio (P1)/(P3) can then be calculated:

$$\frac{(P1)}{(P3)} = \frac{(P1)}{(pws2) + (PDG)}$$

6. On FIG. 8 are shown graphs of calculated potential condensate, and expander pressure ratio versus expanded gas temperature, for an example case where expander pressure ratio exceeds saturation pressure ratio for the expander flue gas.
 7. The pressure and volume path, followed by the expander flue gas while expanding to lower pressures and producing a work output, thus consists of two differing portions:
  a. The first expansion portion from expander inlet pressure down to the saturation pressure ratio, is approximately isentropic, since no condensation occurs. The work output of this first portion can be estimated by conventional methods.
  b. The second expansion portion of the entire flue gas, from the saturation pressure ratio down to the final expander outlet pressure, does not follow the usual isentropic path, since the latent heat of condensation is added to the gas portions. The work output of this second condensing portion can nevertheless be estimated from the total energy changes of both the water portion and the dry gas portion of the expander flue gas, by conventional methods.
  c. Thusly estimated expander work output is shown graphically on FIG. 9, versus expander pressure ratio, for an example case.
  d. The actual pressure volume path of the expander flue gas during this second condensing expansion portion is unclear, since occurrence of condensation may be deferred, causing the flue gas to become supersaturated with water vapor. But the presence of particles promotes condensation and thus suppresses supersaturation and may thus alter the pressure and volume path of expansion. For this reason, final sizing of a flue gas cleaner of this invention is preferably calculated from experimental measurements of expansions of samples of the flue gases to be cleaned over a range of possible expander pressure ratios.
 8. Any consistent system of units can be used in these calculations.
 9. The numerical values shown on FIGS. 7, 8 and 9 are for a particular illustrative example case of a steam boiler and turbine power plant of 10 MW electric output. Details of this example power plant are as follows:
  a. Pulverized bituminous coal fired furnace.
  b. Steam rate 7.53 pounds steam per KWHR; 4183 pound mols per hr boiler steam rate.
  c. Furnace flue gas 3389 pound mols per hr at 15 psia and 350° F.
  d. Liquid water and dry steam added to the furnace flue gas to increase water vapor content to 20 percent by volume and to bring temperature of expander flue gas to 213° F.
  e. Expander flue gas 3742 pound mols per hr at 15 psia and 213° F. at expander entry.
 10. The compressor functions to pump the cleaned flue gas out of the vacuum chamber and back up to the final flue gas discharge pressure, which is usually atmospheric pressure. Thus the compressor pressure ratio is essentially equal to the expander pressure ratio. A work input is needed to drive the compressor and can be estimated by conventional methods, assuming isentropic compression. Compressor flue gas flow rate equals expander flue gas flow rate less the condensate flow rate. Thusly estimated compressor work input is shown graphically on FIG. 9 versus expander and compressor pressure ratio, for the example case. Note that compressor input work and expander output work are equal when no condensate is formed at expander pressure ratios less than the saturation pressure ratio. At pressure ratios where condensation occurs, expander work output exceeds compressor work input, in part as a result of the lesser gas flow quantity going through the compressor.

11. Also shown on FIG. 9 is the net work output of the expander and compressor together. Actual expander work output will be less than these theoretical values due to expander losses. Actual compressor work input will be greater than these theoretical values due to compressor losses.

12. Details of methods for designing the expander engine and the compressor are presented in various references on turbomachinery, examples of which are as follows:
   a. *"Theory and Design of Steam and Gas Turbines,"* J. F. Lee, McGraw Hill, publ., 1954.
   b. *"Aircraft Gas Turbines,"* C. W. Smith, John Wiley, publ., 1956.

The gas flow rates through the expander and compressor are only somewhat less than the steam flow rate through the power plant turbine. Hence the cross sectional flow area of the expander and compressor will be only somewhat less than the cross sectional flow area of some of the lower pressure stages of the power plant turbine.

13. The condensate pump can be sized by conventional methods, to pump at least the maximum potential condensate flow rate from vacuum chamber pressure up to condensate discharge pressure. If particulates are to be filtered out of the liquid condensate, the condensate discharge pressure may need to exceed atmospheric pressure by at least the pressure drop through the particulate filter.

Having thus described my invention, what I claim is:

1. A flue gas cleaner apparatus for removing liquids and solids from flue gases and comprising:
    a source of flue gas to be cleaned and at a flue gas source pressure;
    a source of liquid water at a pressure greater than the flue gas source pressure;
    an expander engine means for producing a power output from the flow of flue gases therethrough, and comprising power absorber means for absorbing said power output, and comprising an expander inlet, and an expander outlet;
    flue gas mixer means for mixing water into flue gas, and comprising a flue gas inlet, a flue gas outlet, at least one water inlet;
    a flow connection from said liquid water source to one of said water inlets of said flue gas mixer;
    said flue gas mixer means being interposed between said source of flue gas and said expander inlet, with a flow connection from said source of flue gas to said mixer flue gas inlet, a flow connection from said mixer flue gas outlet to said expander inlet;
    a vacuum chamber comprising a gas inlet and a gas outlet;
    at least one separator means for separating solid and liquid portions from gas portions of said flue gas, and comprising a separator gas inlet, a separator gas outlet, and a separated liquid and solids outlet;
    a flue gas receptor for cleaned flue gas, at a receptor pressure, and comprising a receptor inlet;
    a compressor means for compressing flue gases up to said receptor pressure, and comprising compressor drive means for driving said compressor, a compressor inlet, and a compressor outlet;
    a receiver for separated solid and liquid portions of said flue gas at a receiver pressure, and comprising a receiver inlet;
    a condensate pump means for pumping separated liquids and solids up to said receiver pressure, and comprising a condensate pump inlet, a condensate pump outlet, a condensate pump drive means for driving said condensate pump, and unidirectional flow means for causing flow to occur only from said pump inlet to said pump outlet;
    a flow connection from said expander outlet to said gas inlet of said vacuum chamber;
    a flow connection from said vacuum chamber gas outlet to said compressor inlet;
    a flow connection from said compressor outlet to said receptor inlet;
    whereby a flue gas flow path is created with flue gas flowing from said flue gas source through said flue gas mixer means, through said expander means, into said vacuum chamber, through said compressor means, and into said flue gas receptor, with the pressure in the vacuum chamber being less than the flue gas source pressure, and also less than the flue gas receptor pressure;
    each said separator means being interposed at some position between said expander inlet and said compressor outlet, within said flue gas flow path, so that flue gas flows through each said separator means, from said separator gas inlet to said separator gas outlet;
    a flow connection from each said separator liquid outlet to said condensate pump inlet;
    a flow connection from said condensate pump outlet to said receiver inlet;
    wherein said expander means and said compressor means first expand, and then recompress, flue gas flowing therethrough, so that the ratio of said flue gas source pressure, to said pressure in the vacuum chamber, exceeds the saturation pressure ratio of the flue gas entering said expander means.

2. A flue gas cleaner apparatus as described in claim 1:
    wherein said separator means comprises at least two separator means, connected together in series, so that flue gas flows in series through all said at least two separator means.

3. A flue and gas cleaner apparatus as described in claim 1:
    wherein said expander engine means drives said compressor means via a common shaft;
    and further wherein said compressor drive means additionally comprises power balancer means, for absorbing any excess of expander work output over compressor work input, and for supplying any excess of compressor work input over expander work output, said power balancer means being operative on said common shaft connecting said engine means and said compressor means.

4. A flue gas cleaner apparatus as described in claim 3:
    wherein said separator means comprises at least two separator means, connected together in series, so that flue gas flows in series through all said at least two separator means.

5. A flue gas cleaner apparatus as described in claim 1:
    wherein said expander engine means is a turbo expander engine, at least one of whose stages is also a centrifugal separator means for separating liquids and solids from flue gases flowing therethrough, and comprising a liquid and solids collector with a liquid and solids outlet;
    and further comprising:
    a flow connection from said liquid and solids collector outlet of said turbo expander engine to said condensate pump inlet.

6. A flue gas cleaner apparatus as described in claim 2:
wherein said expander engine means is a turbo expander engine, at least one of whose stages is also a centrifugal separator means for separating liquids and solids from flue gases flowing therethrough, and comprising a liquid and solids collector with a liquid and solids outlet;
and further comprising:
a flow connection from said liquid and solids collector outlet of said turbo expander engine to said condensate pump inlet.

7. A flue gas cleaner apparatus as described in claim 3:
wherein said expander engine means is a turbo expander engine, at least one of whose stages is also a centrifugal separator means for separating liquids and solids from flue gases flowing therethrough, all comprising a liquid and solids collector with a liquid and solids outlet;
and further comprising:
a flow connection from said liquid and solids collector outlet of said turbo expander engine to said condensate pump inlet.

8. A flue gas cleaner apparatus as described in claim 1:
wherein said compressor means is a turbo compressor, at least one of whose first stages is also a centrifugal separator means for separating liquids and solids from flue gases flowing therethrough, and comprising a liquid and solids collector with a liquid and solids outlet;
and further comprising:
a flow connection from said liquid and solids collector outlet of said turbo compressor to said condensate pump inlet.

9. A flue gas cleaner apparatus as described in claim 2:
wherein said compressor means is a turbo compressor, at least one of whose first stages is also a centrifugal separator means for separating liquids and solids from flue gases flowing therethrough, and comprising a liquid and solids collector with a liquid and solids outlet;
and further comprising:
a flow connection from said liquid and solids collector outlet of said turbo compressor to said condensate pump inlet.

10. A flue gas cleaner apparatus as described in claim 3:
wherein said compressor means is a turbo compressor, at least one of whose first stages is also a centrifugal separator means for separating liquids and solids from flue gases flowing therethrough, and comprising a liquid and solids collector with a liquid and solids outlet;
and further comprising:
a flow connection from said liquid and solids collector outlet of said turbo compressor to said condensate pump inlet.

11. A flue gas cleaner apparatus as described in claim 1:
wherein one of said separator means comprises an electrostatic separator means for separating liquid and solid particles from flue gases flowing therethrough, and comprising:
two oppositely charged and insulated surfaces; charging means for oppositely charging said two surfaces, said surfaces comprising at least one insulated liquid and solids collector with insulated liquid and solids outlet; an electrostatic separator flue gas inlet, and an electrostatic separator flue gas outlet, positioned so that flue gas flows between said two oppositely charged surfaces;
wherein said electrostatic separator means additionally comprises an interrupted flow, insulated, liquids and solids transfer means for transferring liquids and solids from each said insulated liquids and solids collector, into a final liquids and solids receiver so that the liquid flow from said collector into said final receiver is always discontinuous;
wherein all surfaces of said expander means contacted by flue gases flowing therethrough are insulated surfaces;
and further comprising;
a flow connection from said expander outlet to said electrostatic separator flue gas inlet;
a flow connection from said electrostatic separator flue gas outlet to said vacuum chamber gas inlet;
a flow connection from said final liquids and solids receiver of said electrostatic separator to said condensate pump inlet.

12. A flue gas cleaner apparatus as described in claim 2:
wherein one of said separator means comprises an electrostatic separator means for separating liquid and solid particles from flue gases flowing therethrough, and comprising:
two oppositely charged and insulated surfaces; charging means for oppositely charging said two surfaces, said surfaces comprising at least one insulated liquid and solids collector with insulated liquid and solids outlet; an electrostatic separator flue gas inlet, and an electrostatic separator flue gas outlet, positioned so that flue gas flows between said two oppositely charged surfaces;
wherein said electrostatic separator means additionally comprises an interrupted flow, insulated, liquids and solids transfer means for transferring liquids and solids from each said insulated liquids and solids collector, into a final liquids and solids receiver so that the liquid flow from said collector into said final receiver is always discontinuous;
wherein all surfaces of said expander means contacted by flue gases flowing therethrough are insulated surfaces;
and further comprising:
a flow connection from said expander outlet to said electrostatic separator flue gas inlet;
a flow connection from said electrostatic separator flue gas outlet to said vacuum chamber gas inlet;
a flow connection from said final liquids and solids receiver of said electrostatic separator to said condensate pump inlet.

13. A flue gas cleaner apparatus as described in claim 3:
wherein one of said separator means comprises an electrostatic separator means for separating liquid and solid particles from flue gases flowing therethrough, and comprising:
two oppositely charged and insulated surfaces; charging means for oppositely charging said two surfaces, said surfaces comprising at least one insulated liquid and solids collector with insulated liquid and solids outlet; an electrostatic separator flue gas inlet, and an electrostatic separator flue gas outlet, positioned so that flue gas flows between said two oppositely charged surfaces;
wherein said electrostatic separator means additionally comprises an interrupted flow, insulated, liquids and solids transfer means for transferring liquids and solids from each said insulated liquids and solids collector, into a final liquids and solids receiver so that the liquid flow from said collector into said final receiver is always discontinuous;

wherein all surfaces of said expander means contacted by flue gases flowing therethrough are insulated surfaces;

and further comprising:
a flow connection from said expander outlet to said electrostatic separator flue gas inlet;
a flow connection from said electrostatic separator flue gas outlet to said vacuum chamber gas inlet;
a flow connection from said final liquids and solids receiver of said electrostatic separator to said condensate pump inlet.

14. A flue gas cleaner apparatus as described in claim 1:
wherein one of said separator means comprises a cyclone separator means for separating liquids and solids from flue gases flowing therethrough and comprising a liquid and solids collector with a liquid and solids outlet, a cyclone separator inlet, a cyclone separator outlet;
and further comprising:
a flow connection from said expander outlet to said cyclone separator inlet;
a flow connection from said cyclone separator outlet to said vacuum chamber inlet;
a flow connection from said cyclone separator liquid and solids outlet to said condensate pump inlet.

15. A flue gas cleaner apparatus as described in claim 2:
wherein one of said separator means comprises a cyclone separator means for separating liquids and solids from flue gases flowing therethrough and comprising a liquid and solids collector with a liquid and solids outlet, a cyclone separator inlet, a cyclone separator outlet;
and further comprising:
a flow connection from said expander outlet to said cyclone separator inlet;
a flow connection from said cyclone separator outlet to said vacuum chamber inlet;
a flow connection from said cyclone separator liquid and solids outlet to said condensate pump inlet.

16. A flue gas cleaner apparatus as described in claim 3:
wherein one of said separator means comprises a cyclone separator means for separating liquids and solids from flue gases flowing therethrough and comprising a liquid and solids collector with a liquid and solids outlet, a cyclone separator inlet, a cyclone separator outlet;
and further comprising:
a flow connection from said expander outlet to said cyclone separator inlet;
a flow connection from said cyclone separator outlet to said vacuum chamber inlet;
a flow connection from said cyclone separator liquid and solids outlet to said condensate pump inlet.

17. A flue gas cleaner apparatus as described in claim 1 and further comprising:
control means responsive to flue gas flow rate, and operative to control expander pressure ratio to maintain expander pressure ratio greater than the saturation pressure ratio of the flue gas at expander inlet at all flue gas flow rates.

18. A flue gas cleaner apparatus as described in claim 2 and further comprising:
control means responsive to flue gas flow rate, and operative to control expander pressure ratio to maintain expander pressure ratio greater than the saturation pressure ratio of the flue gas at expander inlet at all flue gas flow rates.

19. A flue gas cleaner apparatus as described in claim 3, and further comprising:
control means responsive to flue gas flow rate, and operative to control expander pressure ratio to maintain expander pressure ratio greater than the saturation pressure ratio of the flue gas at expander inlet at all flue gas flow rates.

20. A flue gas cleaner apparatus as described in claim 1, wherein:
said flue gas mixer means further comprising water flow control means, responsive to flue gas flow rate and operative to maintain the saturation pressure ratio of said flue gas at expander inlet, less than the expander pressure ratio of the flue gas source pressure to the pressure in the vacuum chamber.

21. A flue gas cleaner apparatus as described in claim 2, wherein:
said flue gas mixer means further comprising water flow and control means, responsive to flue gas flow rate and operative to maintain the saturation pressure ratio of said flue gas at expander inlet, less than the expander pressure ratio of the flue gas source pressure to the pressure in the vacuum chamber.

22. A flue gas cleaner apparatus as described in claim 3, wherein:
said flue gas mixer means further comprising water flow control means, responsive to flue gas flow rate and operative to maintain the saturation pressure ratio of said flue gas at expander inlet, less than the expander pressure ratio of the flue gas source pressure to the pressure in the vacuum chamber.

23. A flue gas cleaner apparatus as described in claim 1:
wherein said flue gas mixer means further comprises at least two separate water inlets;
and further comprising;
a source of steam at a pressure greater than said flue gas source pressure;
a flow connection from said steam source to one of said water inlets of said flue gas mixer.

24. A flue gas cleaner apparatus as described in claim 2:
wherein said flue gas mixer means further comprises at least two separate water inlets;
and further comprising;
a source of steam at a pressure greater than said flue gas source pressure;
a flow connection from said steam source to one of said water inlets of said flue gas mixer.

25. A flue gas cleaner apparatus as described in claim 3:
wherein said flue gas mixer means further comprises at least two separate water inlets;
and further comprising;
a source of steam at a pressure greater than said flue gas source pressure;
a flow connection from said steam source to one of said water inlets of said flue gas mixer.

26. A process for removing liquid and solid particles from flue gases and comprising the following sequence of process steps:
mixing liquid water into said flue gas to increase the saturation pressure ratio thereof;
expanding said flue gas through a pressure decrease from a source of flue gas into a vacuum chamber, the ratio of said pressure decrease exceeding the saturation pressure ratio of said flue gas at entry to said expansion process, said expansion process being a work output expansion process;
separating condensed liquids and solids from said flue gas;
compressing cleaned flue gas through a pressure increase from said vacuum chamber into a cleaned flue gas receptor and concurrently pumping separated liquids and solids unidirectionally through a pressure increase from said vacuum chamber into a condensate receiver, the work of said compression being supplied, at least in part, by said work output of said expansion process.

27. A process for removing liquid and solid particles from flue gas, as described in claim 26: wherein said process step of separating liquids and solids from said flue gas comprises at least two separating process steps occurring in series.

* * * * *